May 22, 1951 C. P. WEST ET AL 2,554,284
ELECTRICAL DISTRIBUTION SYSTEM
Filed Aug. 22, 1946
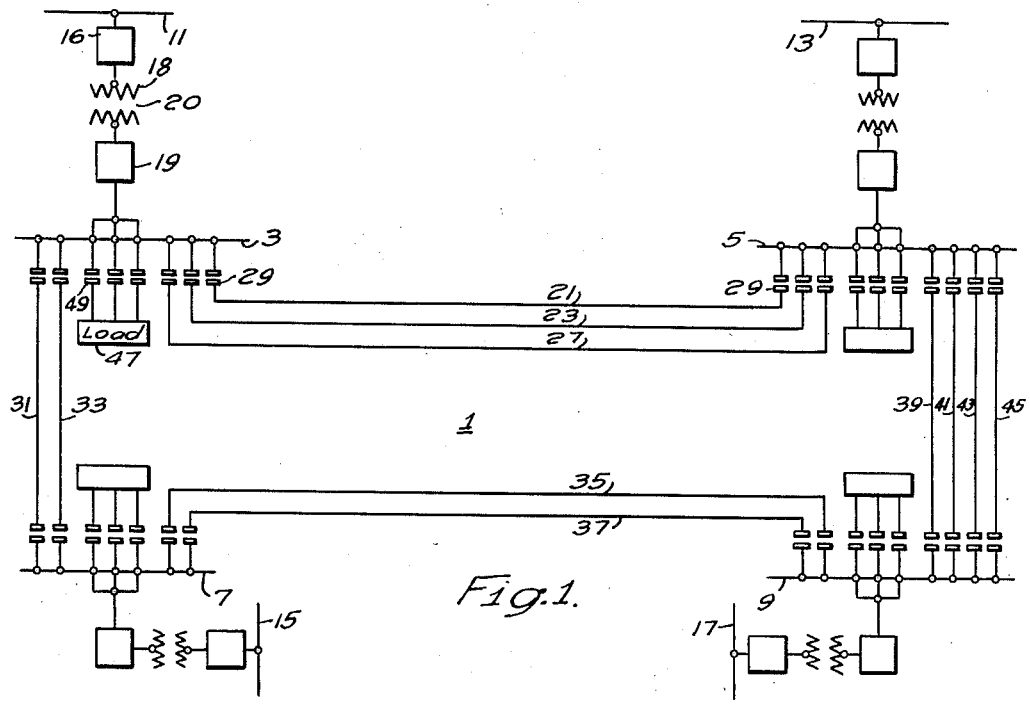
Fig. 1.
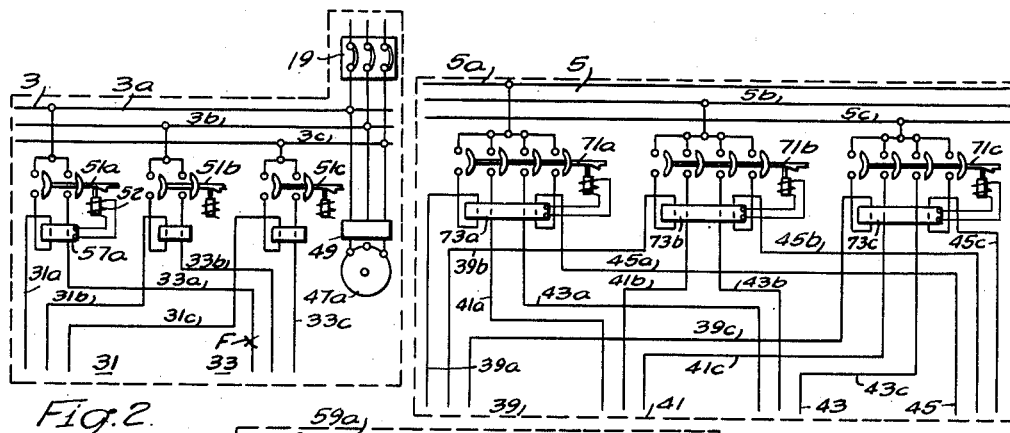
Fig. 2.
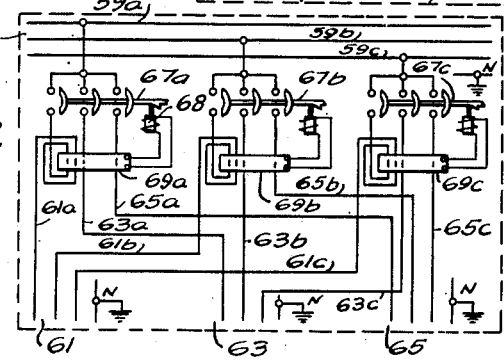
Fig. 3.
Fig. 4.
WITNESSES:
INVENTORS
Charles P. West and
Lawrence L. Fountain.
BY
C. L. Freedman
ATTORNEY Patented May 22, 1951

2,554,284

UNITED STATES PATENT OFFICE 2,554,284

ELECTRICAL DISTRIBUTION SYSTEM

Charles P. West, Pittsburgh, and Lawrence L. Fountain, Wilkinsburg, Pa., assignors to Westinghouse Electric Corporation, East Pittsburgh, Pa., a corporation of Pennsylvania Application August 22, 1946, Serial No. 692,340

5 Claims. (Cl. 175—294)

This invention relates to electrical systems and it has particular relation to electrical network distribution systems employing distribution grids or loops having a plurality of parallel connecting circuits associated therewith.

Network systems are well known in the art for providing primary or secondary network service. Systems of this type are illustrated, for example, in the Parsons Patents 1,997,597 and 1,955,311.

As initially employed, a network system employed a distribution grid operating to distribute electrical energy to various points of utilization. However, more recently, it has been found desirable for certain applications to employ loop circuits in place of grids. Such loop circuits are discussed, for example, in the Parsons Patents 2,300,465, 2,317,552 and 2,340,075.

In order to obtain optimum reliability, economy and performance, the network system sometimes is provided with a plurality of connecting circuits, for example, such parallel connecting circuits may extend between load buses to form therewith a loop circuit. Removal of any one of the connecting circuits from service does not break the loop circuit. The advantages of such parallel connecting circuits are discussed at some length in the Parsons Patent 2,300,465.

Considerable thought has been given to the type of protection to be employed for the aforesaid parallel connecting circuits, for example, in some installations current limiters are inserted in each of the connecting circuits for removing the connecting circuit from service upon the occurrence of a fault therein. Alternatively, expensive current balance relays or directional relays requiring pilot wires have been proposed for such connecting circuits. The protection of parallel connecting circuits is considered in certain of the foregoing patents.

In accordance with the invention, phase conductors associated with the same phase in each of a group of parallel conducting circuits are associated for protective purposes. When currents flowing through the associated phase conductors deviate from a predetermined normal relationship, the phase conductors are removed from service.

In accordance with a preferred embodiment of the invention, a current transformer is associated with the phase conductors associated with the same phase in each of a group of parallel connecting circuits. A portion of the primary energization of the current transformer is derived from each of the associated phase conductors. The resulting energizations are opposed and substantially equal under normal operating conditions of the network system. However, if a fault occurs on one of the phase conductors, the primary energizations of the current transformer become unbalanced and the resulting secondary output is employed for removing the associated phase conductors from service.

Although the output of each of the current transformers may be employed for removing all conductors of associated connecting circuits from service upon the occurrence of a fault on one phase conductor, the invention is particularly suitable for applications wherein single pole tripping is desired. For example, such tripping may be desirable on three-phase four-wire systems.

It is, therefore, an object of the invention to provide an improved network system employing a plurality of parallel connecting circuits in the system network.

It is an additional object of the invention to provide an improved electrical system having a plurality of parallel connecting circuits associated therewith wherein conductors of the same phase in the parallel connecting circuits are removed from service in response to deviation of currents flowing therethrough from a predetermined normal relationship.

It is also an object of the invention to provide an electrical system employing a plurality of parallel connecting circuits wherein conductors associated with the same phase in the connecting circuits are utilized for supplying primary energizations to a current transformer which are substantially equal and opposed under normal system operating conditions, and wherein the secondary output of the current transformer is utilized for controlling the removal from service of the associated phase conductors.

It is a further object of the invention to provide an improved single-pole tripping system for a plurality of parallel connecting circuits associated with an electrical system.

Other objects of the invention will be apparent from the following description, taken in conjunction with the accompanying drawing, in which:

Figure 1 is a schematic view of a single line of an electrical network system in which the invention may be incorporated; and Figs. 2, 3 and 4 are schematic views showing various circuit connections suitable for the system of Fig. 1.

Referring to the drawing, Fig. 1 shows in single line a network system employing a secondary loop circuit 1. The system of Fig. 1 may be single phase or polyphase and may be designed for operation at any suitable frequency. However, for the purpose of discussion, it will be assumed that the system of Fig. 1 is a three-phase system designed for operation at a frequency of 60 cycles per second.

The loop circuit 1 is designed for energization at spaced points from one or more sources of electrical energy. For example, these spaced points may be represented by load buses 3, 5, 7 and 9 which are suitably energized to provide energization for the entire loop circuit. As specific examples, the energization of the loop circuit may be derived from a plurality of power stations represented by power station buses 11, 13, 15 and 17. The bus 11 is connected to the load bus 3 through a station circuit breaker 16, a feeder circuit 18, a stepdown transformer 20 and a network protector 19. The station circuit breaker 16 may be designed to disconnect the feeder circuit 18 from the bus 11 in response to the occurrence of a fault on the feeder circuit.

The network protector 19 is designed to control the connection of the transformer 20 to the load bus 3. Conveniently, the network protector may be designed to disconnect the load bus 3 from the transformer 20 when electrical energy flows from the loop circuit to the transformer 20. In addition, the network protector may be designed to connect the transformer to the load bus 3 when the voltage relationships are such that power will flow from the transformer 20 to the loop circuit. Network protectors of this type are well known in the art. For example, reference may be made to the Parsons Patent 2,082,024. In a similar manner, each of the station buses 13, 15 and 17 may be connected to its associated load bus 5, 7 or 9.

The load buses 3, 5, 7 and 9 are connected by groups of parallel connecting circuits for the purpose of forming the loop circuit 1. For example, the buses 3 and 5 are connected by three parallel connecting circuits 21, 23 and 27. If the system of Fig. 1 is a three-phase system, each of the circuits 21, 23 and 27 is a three-phase circuit. Each of the connecting circuits is connected to the associated load buses through suitable circuit interrupters 29. These circuit interrupters may be of the three-phase type designed to remove the associated connecting circuit completely from service in response to a fault occurring on one or more of the phase conductors thereof. Alternatively, the circuit interrupters 29 may be designed for single pole operation in order to remove only the phase conductors of the associated connecting circuit on which the fault occurs. Suitable constructions of the circuit interrupters will be hereinafter discussed.

In somewhat similar manner, the load buses 3 and 7 are connected by two parallel connecting circuits 31 and 33. The load buses 7 and 9 are connected by two parallel connecting circuits 35 and 37. The load buses 5 and 9 are connected by four parallel connecting circuits 39, 41, 43 and 45. In most systems of the type herein contemplated, the same number of connecting circuits probably would be employed between each pair of load buses. However, different numbers of connecting circuits are illustrated between certain of the load buses of Fig. 1 in order to illustrate certain features of the invention. Any desired loads may be connected to the various load buses for energization therefrom. For example, a load 47 is shown connected to the load bus 3 through circuit interrupters 49. Although three parallel connecting circuits are shown between the load 47 and the load bus 3, the number of circuits employed depend on the nature of the associated load.

In order to provide adequate protection for the connecting circuits, the embodiment illustrated in Fig. 2 may be utilized. Fig. 2 utilizes a portion of the load bus 3 and the phase conductors of this three-phase load bus are identified by the reference characters $3a$, $3b$ and $3c$. The network protector 19 is shown connected to the load bus 3 through only one circuit in Fig. 2. Also, a load $47a$ is illustrated in Fig. 2 connected to the load bus 3 through only one circuit.

The connecting circuit 31 has three phase conductors $31a$, $31b$ and $31c$ which are to be connected, respectively, to the phase conductors $3a$, $3b$ and $3c$ of the load bus 3. Similarly, the connecting circuit 33 has three phase conductors $33a$, $33b$ and $33c$ which are to be connected respectively to the phase conductors $3a$, $3b$ and $3c$ of the load bus. As previously explained, the connections of the feeder circuits 31 and 33 to the load bus 3 may be controlled by three-phase circuit interrupters which remove the entire connecting circuits from service in response to occurrence of a fault therein. However, since the invention is particularly suitable for single pole tripping, such tripping is illustrated in Fig. 2.

The phase conductors $31a$ and $33a$ of the connecting circuits are connected to the phase conductor $3a$ of the load bus through a circuit interrupter 51 having a tripping solenoid 52 associated therewith. In a similar manner, the phase conductors $31b$ and $33b$ are connected to the phase conductor $3b$ through a circuit interrupter $51b$ and the phase conductors $31c$ and $33c$ are connected to the phase conductor $3c$ through a circuit interrupter $51c$.

The tripping of the circuit interrupter $51a$ is controlled by the secondary output of a current transformer $57a$. This current transformer may be of the wound type. Since a through type current transformer is particularly suitable for the invention, such a transformer is illustrated in Fig. 2.

It will be noted that both of the phase conductors $31a$ and $33a$ pass through the current transformer $57a$ to supply primary energizations thereto. The phase conductor $33a$ passes directly through the current transformer, but the phase conductor $31a$ passes therethrough in a reverse direction. Consequently, under normal conditions of energization of the system, the primary energizations resulting from currents flowing through the conductors $31a$ and $33a$ are opposed and substantially equal, and the current transformer $57a$ has substantially no secondary output. Let it be assumed, however, that a fault F occurs on the phase conductor $33a$. Current supplied from the load bus 3 through the phase conductor $33a$ to the fault F becomes substantially larger than current supplied by the load bus 3 to the phase conductor $31a$. Consequently, the condition of balance in the primary energization of the current transformer $57a$ no longer obtains, and a secondary output is obtained which trips the circuit interrupter $51a$. Such tripping removes the faulty phase conductor $33a$ from service. The phase conductor $31a$ is also removed from service, but the load bus 7 of Fig. 1 continues to receive phase $a$ energy from the associated station bus 15, and from the other station buses through the connecting circuits 35 and 37. It will be noted that the operation of the circuit interrupter 51a does not result in operation of the circuit interrupters 51b or 51c. The circuit interrupters 51b and 51c are similarly associated respectively with the phase conductors 31b and 31c and with the phase conductors 31c and 33c to provide similar protection for these phase conductors.

Each end of each of the connecting circuits, such as the circuits 31 and 33, may be connected to its associated load bus in a similar manner. When a fault occurs on one of the connecting circuits, both ends of the faulty circuit are disconnected in a similar way from the associated load buses.

In Fig. 3, the application of the invention to three connecting circuits is illustrated. In Fig. 3 a load bus 59 is illustrated which corresponds to a portion of the load bus 3. In addition, three connecting circuits 61, 63 and 65 are illustrated which correspond, respectively, to the connecting circuits 21, 23 and 27 of Fig. 1. Fig. 3 illustrates a three-phase four-wire system wherein a neutral conductor N is shown as grounded. As previously explained, single pole tripping may be desirable in such three-phase four-wire systems. Phase conductors 61a, 63a and 65a of the three connecting circuits are connected to the phase conductor 59a of the load bus 59 through a circuit interrupter 67a. This circuit interrupter 67a would be included in the circuit interrupter 29 of Fig. 1. The circuit interrupter 67a is provided with a tripping solenoid 68 which is energized in accordance with the secondary output of a current transformer 69a. The current transformer 69a receives three primary energizations from the phase conductors 61a, 63a and 65a. The phase conductors 63a and 65a pass directly through the current transformer 69a.

By inspection of Fig. 3, it will be noted that the ampere turns supplied to the current transformer 69a by the phase conductor 61a are substantially equal and opposed to the ampere turns of the phase conductors 63a and 65a combined. Since the three phase conductors 61a, 63a and 65a are substantially similar in construction, current divides substantially equally among these phase conductors under normal system operating conditions. However, the phase conductor 61a has two turns supplying energy to the current transformer 69a compared to one turn for each of the phase conductors 63a and 65a. The directions of the turns are so related that under normal operating conditions the magnetomotive force produced by current flowing through the phase conductor 61a substantially equals and opposes the resultant magnetomotive force produced by the combined currents flowing through the conductors 63a and 65a. Consequently, under normal operating conditions of the system, the secondary output of the current transformer 69a is substantially zero. However, should a fault occur on any of the phase conductors 61a, 63a and 65a, the balance of the primary energization of the current transformer 69a is disturbed and a secondary output of the current transformer trips the associated circuit interrupter 67a to remove the phase conductors 61a, 63a and 65a from service. It will be understood that a similar operation occurs at each end of the connecting circuits. The phase conductors 61b, 63b and 65b similarly are associated with a current transformer 69b and a circuit interrupter 67b for energization from the phase conductor 59b of the load bus 59.

Also, the phase conductors 61c, 63c and 65c of the connecting circuits are similarly associated with a current transformer 69a and a circuit interrupter 67c for energization from the phase conductor 59c of the load bus 59.

Fig. 4 illustrates the invention applied to four parallel connecting circuits. In Fig. 4, a portion of the load bus 5 is shown suitably connected to the four connecting circuits 39, 41, 43 and 45. The phase conductor 5a of the bus is connected to the corresponding phase conductors 39a, 41a, 43a and 45a of the connecting circuits through a circuit interrupter 71a and a current transformer 73a. Since the connecting circuits are similar in construction, current from the phase conductor 5a of the load bus divides substantially equally among the four phase conductors 39a, 41a, 43a and 45a. These last-named four phase conductors all pass through the current transformer 73a to supply primary energizations thereto, but the directions of the turns associated with the phase conductors are such that the ampere turns in the current transformer produced by the phase conductors 39a and 45a oppose the ampere turns produced by the phase conductors 41a and 43a. Consequently, under normal operating conditions, the secondary output of the current transformer 73a is substantially zero. However, if a fault occurs on any one of the four phase conductors, the balance of primary energizations in the current transformer is disturbed and the resulting energization trips the circuit interrupter 71a to remove the four phase conductors from service. In a similar manner, the phase conductors 39b, 41b, 43b and 45b are associated with a current transformer 73b and a circuit interrupter 71b for connection to the phase conductor 5b of the load bus. Also, the phase conductors 39c, 41c, 43c and 45c of the connecting circuits are associated with a current transformer 73c and a circuit interrupter 71c for connection to the phase conductor 5c of the load bus.

The foregoing examples show clearly how any number of parallel connecting circuits may be associated with current transformers and circuit interrupters to obtain adequate protection. In each case, the phase conductors associated with the current transformers are provided with an appropriate number of turns and the turns are suitably directed to produce two resultant energizations which are substantially equal and opposed under normal system operating conditions. The secondary output of the current transformer controls the connection of the associated phase conductors to a load bus. In each case, a similar arrangement is provided at each end of the parallel connecting circuits.

The invention is particularly effective for systems wherein connecting circuits can receive energy from both ends thereof. For example, referring to Fig. 2, it will be noted that when the fault F occurs on the phase conductor 33a, fault current flows from the phase conductor 3 of the load bus through the current transformer 57a to the fault F. In addition, fault current may flow in the phase conductor 31a through the current transformer 57a and the circuit interrupter 51a to the fault F. Such fault current would be in a direction such that the ampere turns of the fault currents in the current transformer 57a would be additive. This assures a substantial secondary output from the current transformer 57a.

Although the invention has been described with reference to certain specific embodiments there-

We claim as our invention:

1. In an electrical network system, a plurality of sources of electrical energy, at least three electrically parallel conductors extending between said sources, and means responsive to deviation of electrical currents flowing through the parallel conductors from a predetermined normal relationship for interrupting the flow of said electrical currents, said means comprising a current transformer, means for energizing the current transformer in accordance with current flowing through part only of said parallel conductors, means for energizing the current transformer in accordance with current flowing through the remainder of said parallel conductors, said energizations of the current transformer under normal operating conditions of the system being substantially equal and opposed to produce a substantially zero secondary output from the transformer, and circuit interrupting means responsive to the secondary output for interrupting the flow of said currents.

2. In a polyphase electrical network system, a plurality of polyphase sources of electrical energy, at least three parallel polyphase circuits connecting said polyphase sources of electrical energy, separate circuit interrupting means for each phase of said polyphase circuits, each of the circuit interrupting means controlling the currents flowing through a similar phase conductor of each of said polyphase circuits, each of the circuit interrupting means comprising means responsive to deviation of electrical currents flowing through the associated phase conductors from a predetermined normal relationship for interrupting the flow of the electrical currents in the associated phase conductors, said last named means comprising a current transformer having at least three primary windings each connected for energization in accordance with current flowing in a separate one of the associated phase conductors, and a common secondary winding, said primary windings being proportioned and connected to produce substantially no resultant induced voltage in the secondary winding when substantial currents in all of said associated phase conductors have a predetermined relationship of magnitudes, and a circuit interrupter responsive to the output of the secondary winding.

3. In an electrical system, a current transformer having a secondary and having at least three separate primary turns passing therethrough, means connecting said primary turns in parallel for energization from a common source, said primary turns being divided into reversely associated portions for producing a zero secondary output from the current transformer when equal currents flow through said three primary turns, a circuit interrupter, and means responsive to the secondary output of the current transformer for tripping the circuit interrupter.

4. In a polyphase electrical network system, a plurality of polyphase sources of electrical energy, at least three electrically parallel polyphase circuits connecting said polyphase sources of electrical energy, separate circuit interrupting means for each phase of said polyphase circuits, each of the circuit interrupting means controlling the currents flowing through a similar phase conductor of each of said polyphase circuits, each of the circuit interrupting means comprising a current transformer, means for energizing the current transformer in accordance with current flowing through part only of the associated phase conductors, means for energizing the current transformer in accordance with current flowing through the remainder of the associated phase conductors, said energizations of the current transformer under normal operating conditions of the system being substantially equal and opposed to produce a substantially zero secondary output from the transformer, and a circuit interrupter unit responsive to the secondary output of the current transformer for interrupting the flow of currents through the associated phase conductors.

5. In an electrical network system, a plurality of load buses, ties extending between the load buses to form therewith a loop, at least one of said ties comprising a plurality of parallel tie circuits each having a plurality of circuit conductors, and means responsive to deviation of electrical currents flowing through parallel conductors of said parallel tie circuits from a predetermined normal relationship for interrupting the flow of said electrical currents, said means comprising a current transformer having at least two primary windings each connected for energization in accordance with current flowing in a separate one of the parallel conductors, and a common secondary winding, said primary windings being proportioned and connected to produce in response to substantial currents in the parallel conductors of a predetermined relationship substantially no induced voltage in the secondary winding, and translating means responsive to the output of the secondary winding, said one of the ties comprising three electrically parallel tie circuits, and said current transformer having three primary windings each connected for energization in accordance with current flowing in a separate one of the parallel conductors, said primary windings being proportioned and connected to produce in response to substantially equal currents flowing in the parallel conductors substantially no induced voltage in the secondary winding.

CHARLES P. WEST.
LAWRENCE L. FOUNTAIN.

REFERENCES CITED

The following references are of record in the file of this patent:

UNITED STATES PATENTS

| Number | Name | Date |
|---|---|---|
| 1,259,453 | Burnham | Mar. 12, 1918 |
| 1,398,620 | Beard | Nov. 29, 1921 |
| 1,489,517 | Biles | Apr. 8, 1924 |
| 1,539,658 | Fitzgerald | May 26, 1925 |
| 1,547,053 | Leeson | July 21, 1925 |
| 1,650,593 | Biermanns | Nov. 29, 1927 |
| 1,770,398 | Gallop et al. | July 15, 1930 |
| 2,104,644 | Greenslade | Jan. 4, 1938 |
| 2,300,465 | Parsons | Nov. 3, 1942 |

FOREIGN PATENTS

| Number | Country | Date |
|---|---|---|
| 13,355 | Great Britain | June 6, 1912 |
| 205,899 | Great Britain | Oct. 29, 1923 |